April 4, 1950     L. W. PAGETT     2,502,667
TRIPOD OR STAND
Filed Feb. 14, 1947     2 Sheets-Sheet 1
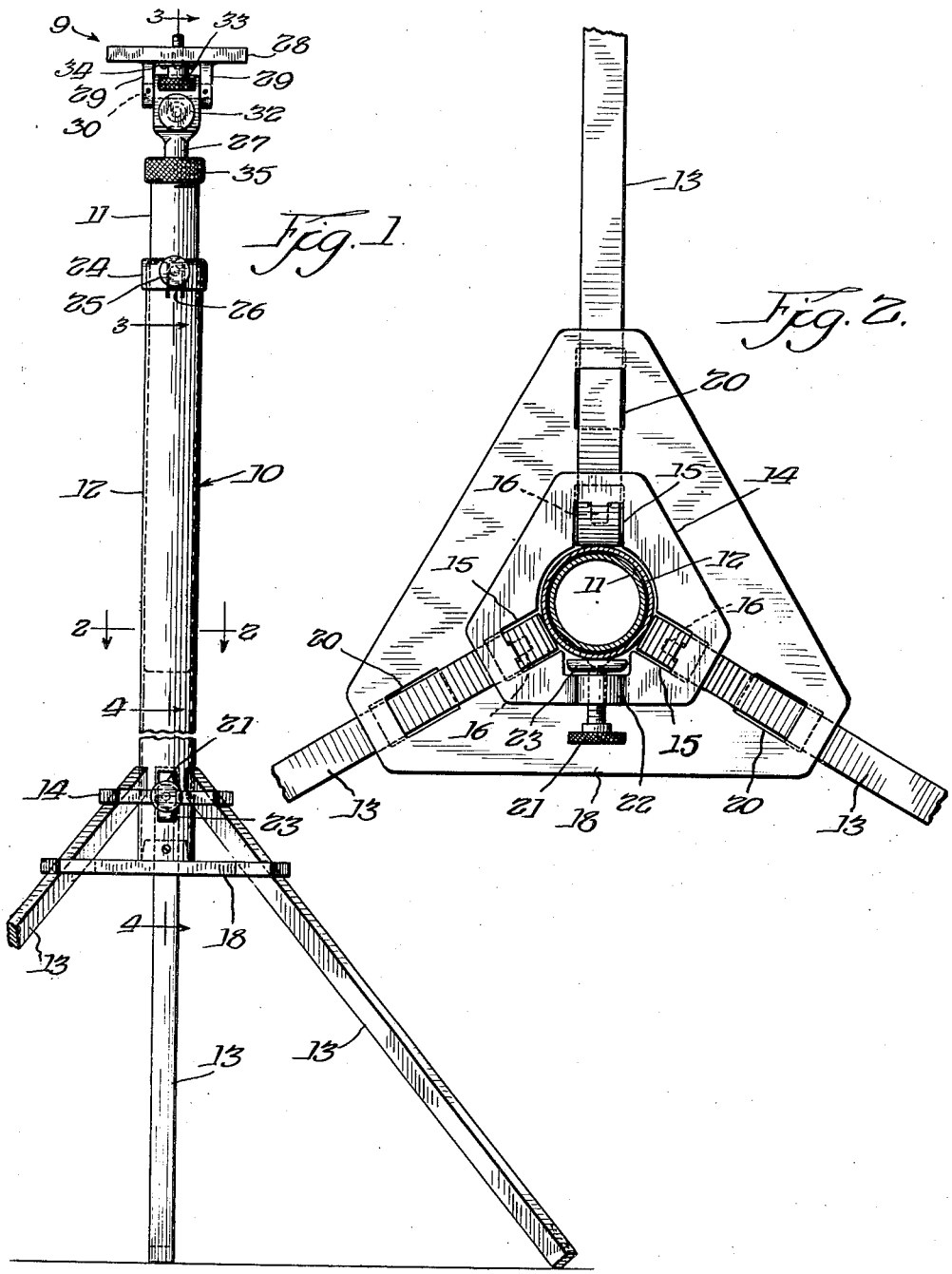
Inventor:
Louis W. Pagett.

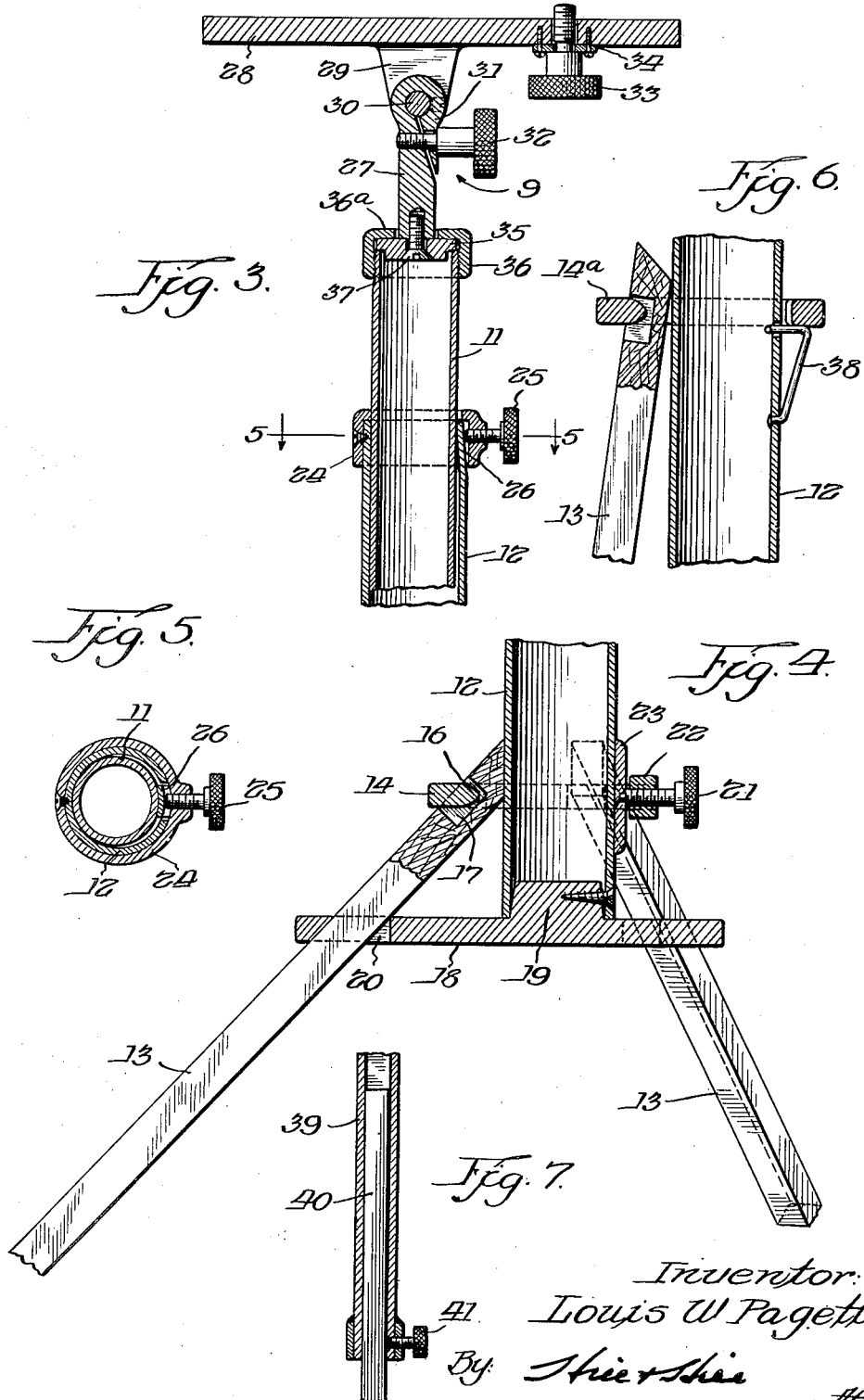

Patented Apr. 4, 1950

2,502,667

UNITED STATES PATENT OFFICE 2,502,667

TRIPOD OR STAND

Louis W. Pagett, Chicago, Ill.

Application February 14, 1947, Serial No. 728,536

2 Claims. (Cl. 248—176)

This invention relates to tripods or stands and among its objects are to provide an extensible and contractible standard, with extensible and collapsible legs. Said standard provides means for supporting any of several interchangeable heads adapted to support objects such as a camera, a motion picture camera, a music rack, a microphone, lamps and many other objects.

Another object is to provide a tripod which shall be light in weight, easy to handle, adjustable to various heights, and can be set up and taken down at great speed.

Another object is to provide a tripod with a tiltable head on which a camera may be held at various angles to a horizontal line.

With these and other objects and advantages in view, this invention consists in the several novel features of construction, arrangement and combination of parts hereinafter fully set forth and more particularly defined in the appended claims.

The invention is clearly illustrated in the drawings accompanying this specification, in which:

Fig. 1 is a side elevation of a tripod or stand embodying a simple form of the present invention and showing one of the legs partly broken away;

Fig. 2 is an enlarged horizontal section taken on the line 2—2 of Fig. 1 and showing the legs partly broken away;

Fig. 3 is an enlarged detail fragmental vertical section taken on the line 3—3 of Fig. 1;

Fig. 4 is a detail fragmental vertical section taken on the line 4—4 of Fig. 1;

Fig. 5 is a detail horizontal section taken on the line 5—5 of Fig. 3;

Fig. 6 is a fragmental vertical section through a modified connector support; and Fig. 7 is a longitudinal section through a modified form of leg.

Referring to said drawings and first to Figs. 1 to 5 inclusive, the reference character 10 designates an extensible and contractible standard, preferably composed of telescopic tubes 11, 12 having means to secure them together in any position of adjustment.

Associated with the standard are legs 13, three being shown, connected at their upper ends to the standard by a connecting member 14, here shown as comprising a plate of generally triangular form having a central opening to receive the standard and three equidistantly spaced openings 15 disposed circumferentially about the center of the plate. Projecting into the openings 15 are lugs 16 which are formed on the plate and project into recesses or sockets 17 formed in the legs 13 at places adjacent their upper ends. The upper ends of the legs extend through the openings 15 with the lugs entering the recesses, thus providing pivotal connections between the legs and connecting member. Preferably the upper ends of the legs are beveled off so as to bear flatly against the standard when extended as shown.

Secured to the bottom of the outer telescopic tube 12 is a leg spreader 18, here shown in the form of a generally triangular plate, having an upstanding boss 19 fastened to the tube 12 as by a screw. Three equidistantly spaced openings 20 are formed in the leg spreader and are disposed circumferentially about the axis of the tube, and the legs extend through said openings. The openings in the leg spreader are located farther away from the axis of the standard than the openings in the connecting member, so that when the latter is moved downward or permitted to fall, the lower ends of the legs will be spread further apart so as to provide a rigid relatively wide supporting base for the device.

Means are provided for supporting the connecting member on the tube 12, whereby the connecting members and legs may be supported in their raised or contracted position, and one such means may comprise a set screw 21, threadedly mounted in an internally threaded boss 22 formed on the connecting member, said screw having flat block 23 swiveled on its threaded end and adapted to bear against the outer tube 12.

Surrounding and secured to the upper end of the outer tube as by a screw is a ferrule 24 in which is threadedly mounted a set screw 25 which bears against a tongue 26 of the outer tube and impinges it against the inner tube when the set screw is screwed up tight. The tongue 26 is formed by forming a pair of slits in the upper end portion of the outer tube. By backing off the set screw 25 slightly, the telescopic tubes may be readily extended or contracted as the case may be. Sufficient clearance is left between the two tubes to permit free and easy extension or contraction of the standard.

The upper end of the inner tube may be used for supporting various objects, such as a camera, a motion picture camera, a music rack, a microphone, lamps, etc., and it is here shown as provided with a head 9 to support a camera. As shown, the head comprises a post 27 secured to and extending up from the inner tube, and upon this post is pivotally attached a table 28 having downwardly projecting ears 29 that are connected by a pin 30 which is rotatively mounted in a split clamp 31 formed upon the upper end of the post. A set screw 32 is threadedly mounted in one member of the clamp and has a shouldered portion which bears against the other member of the clamp. By backing off the clamp screw 32 slightly, the table 28 may be readily tilted to any desired angle to a horizontal line, thereby tilting the camera supported thereon to the desired angle. A set screw 33 is rotatively mounted, as by a ring 34, on the under side of the table and the threaded end of the set screw projects upward through a hole in the table and provides means for attaching a camera to the table as is customary.

The post may be attached to the inner tube in any desirable manner. As shown, a flanged ring 35 rests upon the upper end of the inner tube and a ferrule 36 is threadedly mounted upon the upper end of the inner tube and its flange 36a may be screwed down tight on the flanged ring to clamp it upon the tube. The post extends through a hole in the flange and rests upon the flanged ring, and a screw 37 connects the post with the flanged ring.

In the modified form of supporting means for the connecting member shown in Fig. 6, a resilient catch 38 is secured at its lower end to the outer tube 12 and normally inclines in an upward and outward direction and in the path of movement of the connecting member 14a. By lifting the connecting member up past the catch and releasing the connecting member it will rest on the catch. To lower the connecting member the catch is forced back thereby freeing the connecting member, permitting it, and therewith the legs, to fall to their lowermost or extended position.

In the modified form of leg shown in Fig. 7, the leg is made telescopic whereby it may be extended or contracted to provide for vertical adjustment for the standard and to provide for more or less widely spreaded legs. The outer telescopic member 39 may be in the form of a tube and may be pivotally connected to the connecting member by means substantially shown in Fig. 4. The inner member may be in the form of a bar which telescopes into the tube. A set screw 41 threadedly mounted in the tube provides means for securing the two leg members together in any position of adjustment.

From the above it is apparent that I have provided a tripod or stand that is vertically adjustable whereby the object supported thereby may be held at any desired height within given limits, is quicker in action, that the head is tiltable whereby a camera or other object may be held at any desired angle and that the legs may be extended to obtain a greater or lesser spread.

Having thus described my invention, it is obvious that various immaterial modifications may be made in the same without departing from the spirit of my invention; hence, I do not wish to be understood as limiting myself to the exact form, construction, arrangement and combination of parts herein shown and described or uses mentioned.

What I claim as new and desire to secure by Letters Patent is:

1. A tripod comprising a telescopic standard, composed of several telescopic members, the upper end of the outer telescopic member being slit at two places to provide a tongue, a ferrule secured upon the upper end of the outer telescopic member, a set screw threaded in said ferrule and arranged to bear against said tongue to press the latter against the inner telescopic member, a base comprising several legs arranged about and secured to the standard, and capable of being raised and lowered with respect thereto.

2. A tripod comprising a telescopic standard, a ring bearing against the upper end of the standard, a flanged ferrule threadedly secured on the upper end of the standard and adapted to clamp the ring between the standard and ferrule, a post secured to said ring, a base secured to the standard, a table pivotally mounted upon said post and having a screw extending through the table for mounting an object thereon and clamp means for securing the table in any position of adjustment.

LOUIS W. PAGETT.

REFERENCES CITED

The following references are of record in the file of this patent:

UNITED STATES PATENTS

| Number | Name | Date |
|---|---|---|
| 243,298 | Perkins | June 21, 1881 |
| 263,606 | Smith | Aug. 29, 1882 |
| 773,787 | Crossman et al. | Nov. 1, 1904 |
| 1,327,611 | Burns et al. | Jan. 13, 1920 |
| 1,394,596 | Wohl et al. | Oct. 25, 1921 |
| 1,894,695 | Ley | Jan. 17, 1933 |
| 2,318,633 | Ries | May 11, 1943 |
| 2,374,021 | Korling | Apr. 17, 1945 |

FOREIGN PATENTS

| Number | Country | Date |
|---|---|---|
| 320,777 | Great Britain | Oct. 24, 1929 |